United States Patent
Hallanger

[15] 3,680,216
[45] Aug. 1, 1972

[54] METHOD OF MEASURING THE RELATIVE DEPTH BETWEEN TWO OR MORE UNDERWATER LOCATIONS

[72] Inventor: Lawrence W. Hallanger, Osnard, Calif.

[73] Assignee: The United States of America as represented by the Secretary of the Navy

[22] Filed: Feb. 24, 1971

[21] Appl. No.: 118,247

[52] U.S. Cl..................................33/301, 33/367
[51] Int. Cl. ...........................................G01c 5/04
[58] Field of Search.........................................33/209

[56] References Cited

UNITED STATES PATENTS

| 259,408 | 6/1882 | Macdonald | 33/209 |
| 986,109 | 3/1911 | Weymouth | 33/209 |
| 1,042,248 | 10/1912 | McGowan | 33/209 |
| 1,349,613 | 8/1920 | Kaspar et al. | 33/209 |
| 2,295,957 | 9/1942 | Laurencelle | 33/209 |
| 2,789,365 | 4/1957 | Houge | 33/209 |
| 2,971,264 | 2/1961 | Cowan | 33/209 |

FOREIGN PATENTS OR APPLICATIONS

| 342,524 | 7/1904 | France | 33/209 |
| 100,948 | 1/1899 | Germany | 33/209 |

*Primary Examiner*—Robert B. Hull
*Attorney*—Richard S. Sciascia, Q. Baxter Warner and Gayward N. Mann

[57] ABSTRACT

A method of measuring the relative underwater depth between two or more underwater locations utilizing a gas filled hose connected at each end to a transparent vertically extending measuring tube with the lower end of both tubes open to provide a gas-water interface. Thus when the tube at one end of the hose is moved up or down, depending on the depth of the underwater terrain, the gas-water interface shifts relative to that measuring tube to maintain a level with the gas water interface(s) and the other tube(s).

3 Claims, 3 Drawing Figures

PATENTED AUG 1 1972 3,680,216

LAWRENCE W. HALLANGER
INVENTOR

BY
ATTORNEYS 3,680,216

METHOD OF MEASURING THE RELATIVE DEPTH BETWEEN TWO OR MORE UNDERWATER LOCATIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present device relates generally to a method for determining the elevation differences between two or more underwater points and more particularly to a method for utilizing equality of hydrostatic pressure variations at such submerged points to provide comparative depth measurements.

2. Description of the Prior Art

Heretofore relative underwater depth measurements were made generally by optical devices such as sighting tubes, laser beams and stereo cameras. However, an inherent disadvantage in such methods is that they are very inefficient or inoperable as water turbidity increases or where line of sight operations are not feasible. In order to offset such disadvantages the present method was developed which employs non-optical methods to obtain highly accurate relative depth determinations.

SUMMARY OF THE INVENTION

The present invention utilizes a relative depth measuring device involving one or more gas filled hoses providing a duct interconnecting at each end with a transparent vertically oriented measuring tube with the lower end of each tube open to provide a gas-water interface within each tube. Thus when one tube is moved either up or down depending on the aquatic terrain, the gas-water interface remains at the same level and changes in elevation of the tube are indicated by a change in location of the interface on the measuring tube. However, if the bases of the tubes are at the same level the measuring tubes will so indicate.

STATEMENT OF THE OBJECTS OF THE INVENTION

Accordingly, one object of the invention is to provide a method of comparing hydrostatic pressure between two or more underwater points and deriving geographic height measurement therefrom.

Another object is to provide a method of obtaining highly accurate relative depth measurements based on non-optical methods where the presence of turbidity and underwater obstacles is immaterial.

Other objects, advantages and novel features of the invention will become apparent from the following detailed description of the invention when considered in conjunction with the accompanying drawings wherein:

DESCRIPTION OF THE PREFERRED EMBODIMENT

Figure 2:
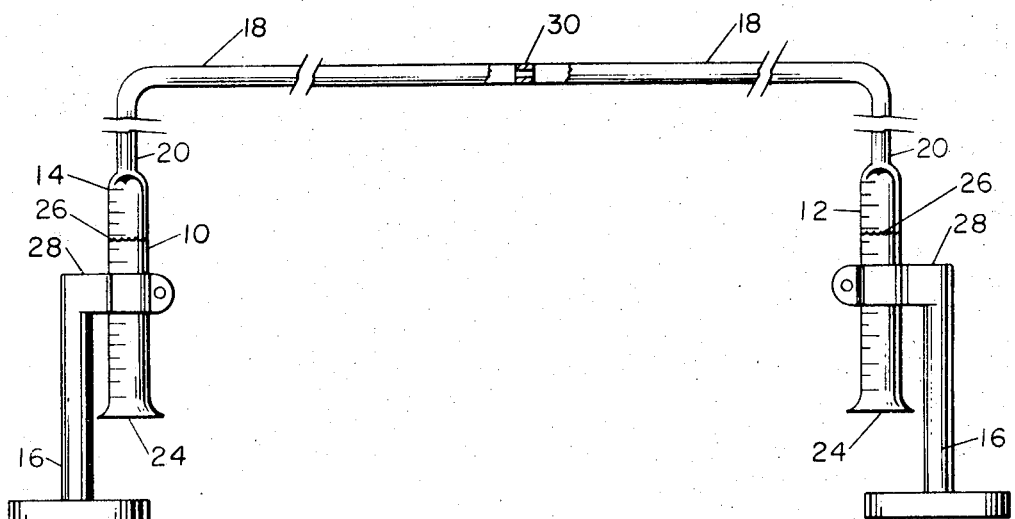
FIG. 2 is an enlarged view of a pair of measuring tubes and supports interconnected by a hose.

The present invention is a method for comparing hydrostatic pressure between two or more underwater points and deriving geographic height measurement therefrom. As shown in FIG. 2, the method comprises the use of a minimum of two spaced vertically oriented transparent tubes 10 and 12, both having mensuration indicia or graduations 14 marked thereon.

A grade stake or similar support means 16 is attached to each tube 10 and 12 by clamp 28 and is adapted to hold its respective tube in a fixed vertical position on the ocean floor or any structure situated thereon. A flexible gas or air filled hose 18 provides a duct interconnecting the upper ends 20 of the tubes 10 and 12 while the lower ends 24 are open to provide a gas-water interface.

Figure 3:
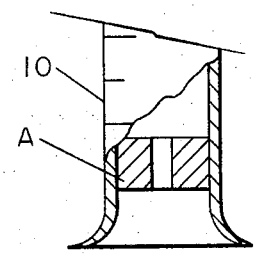
FIG. 3 is a detailed view partly broken away showing a restriction located in the lower end of one of the measuring tubes.

Thus, when one tube is moved either up or down, depending on the terrain of the ocean floor, the gas-water interface will shift within the tube and is so indicated on the measuring tube graduations. It is to be noted that the hydrostatic pressure will vary from moment to moment due to changes in the height of an ocean wave thereover at any given moment which requires a corrective means such as an averaging technique or device. One corrective device may be a restriction 30 located at some point in the hose 18 extending between the measuring tubes 10 and 12 or, alternatively, the restriction may be positioned near the lower end of one or more tubes at a point indicated in FIG. 3 and bearing the reference letter "A", the purpose of the restriction being to average out wave effects and render the indicated reading more accurate.

Figure 1:
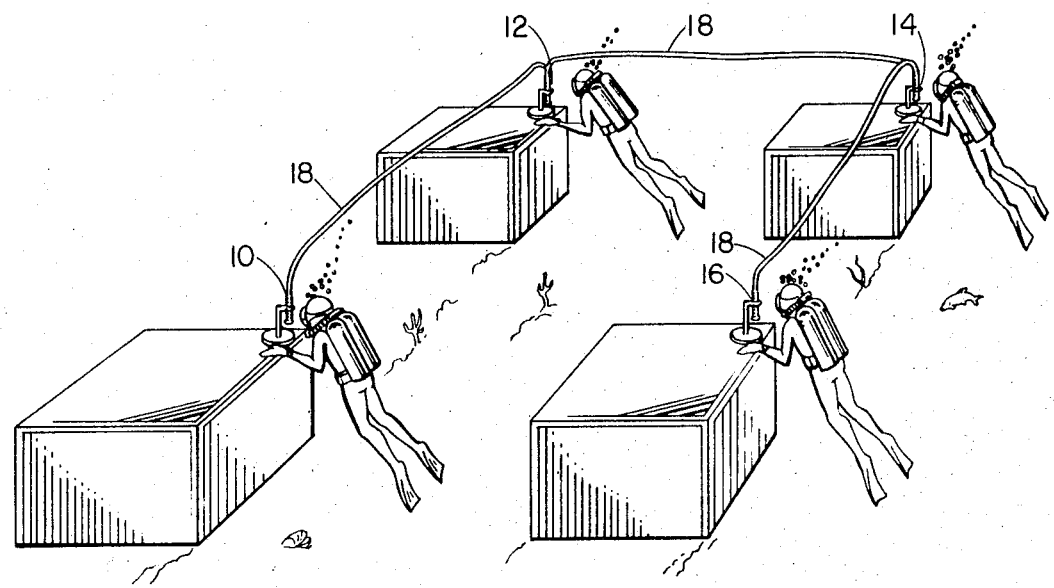
FIG. 1 is a perspective view of the invention showing the tubing and a multiplicity of measuring rods in use on underwater structures.

It will be apparent from FIG. 1 that the present device is not limited to a single pair of interconnected measuring tubes 10 and 12 respectively. This figure illustrates four such spaced tubes indicated as 10, 12, 14 and 16, all of which are interconnected by suitable hoses 18. The hoses each may include a restriction 30. Of course in use it makes no difference whether the upright transparent tubes are within sight of each other. By providing a multitude of interconnected measuring tubes, the necessity of moving a single pair of such tubes at different locales at frequent intervals is avoided thereby reducing the possibility of procedural error.

Obviously many modifications and variations of the present invention are possible in the light of the above teachings. It is therefore to be understood that within the scope of the appended claims the invention may be practiced otherwise than as specifically described.

I claim:

1. The method of measuring the relative underwater depth between two or more underwater locations comprising:

interconnecting the upper ends of a plurality of transparent measuring tubes with a flexible duct, said tubes having mensuration graduations thereon;

positioning said tubes on the aquatic terrain in a vertical orientation;

filling said measuring tubes with gas so as to provide a gas-water interface within the tube;

moving at least one of said tubes either up or down on the submerged terrain which changes the graduation reading on the tubes as compared to the constant gas-water interface;

calculating the relative depth between at least two of said tubes by comparing the graduation reading on each tube.

2. The method of claim 1 further defined by:

restricting the flow of gas in said flexible duct to prevent undue influence of an ocean wave passing over the measuring tube.

3. The method of claim 1 further defined by:

restricting the flow of fluid in said tubes to prevent undue influence of an ocean wave passing over said tube.

* * * * *